(No Model.) 2 Sheets—Sheet 1.
J. F. EDMISTON.
COTTON SEED PLANTER AND CULTIVATOR.
No. 310,191. Patented Jan. 6, 1885.
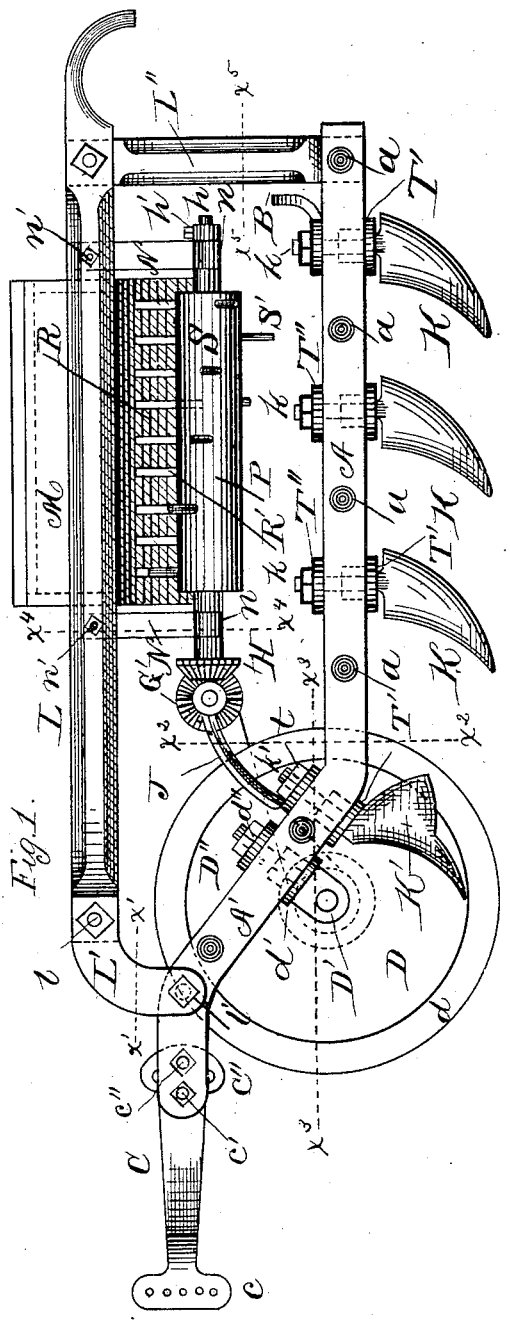
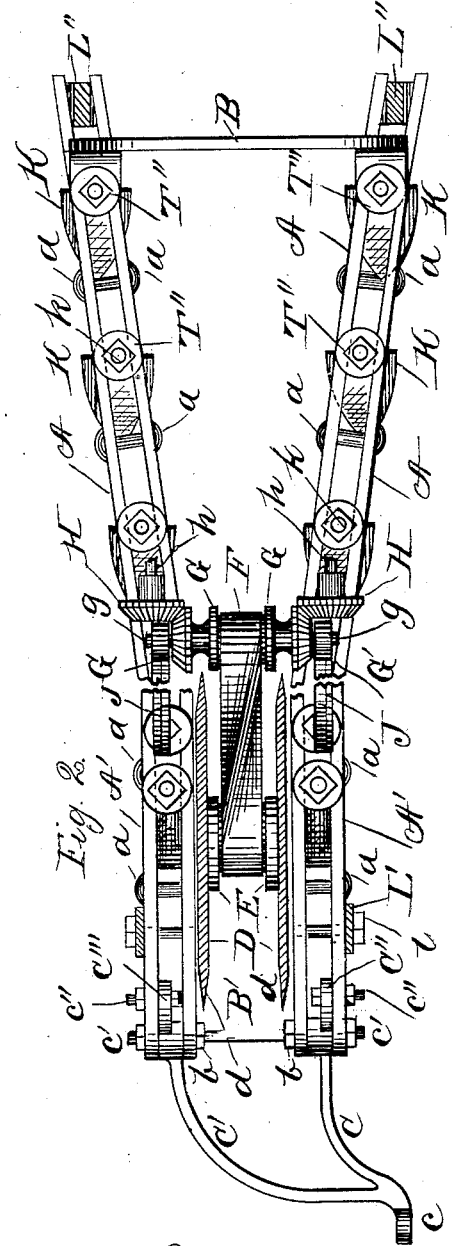
Witnesses
John C. Miller
A. L. Keyser
John F. Edmiston
Inventor
By
E. H. Gelston
Attorney.

(No Model.) 2 Sheets—Sheet 2.
J. F. EDMISTON.
COTTON SEED PLANTER AND CULTIVATOR.
No. 310,191. Patented Jan. 6, 1885.
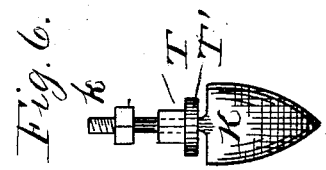
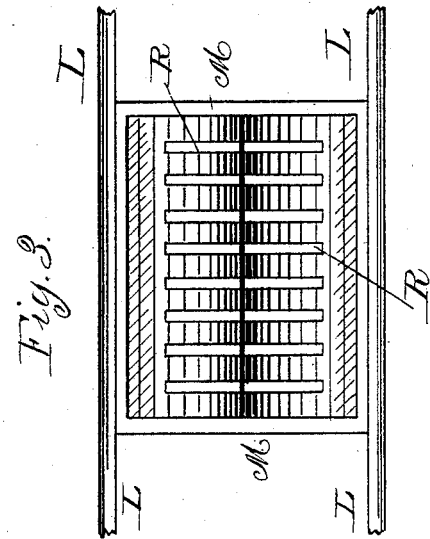
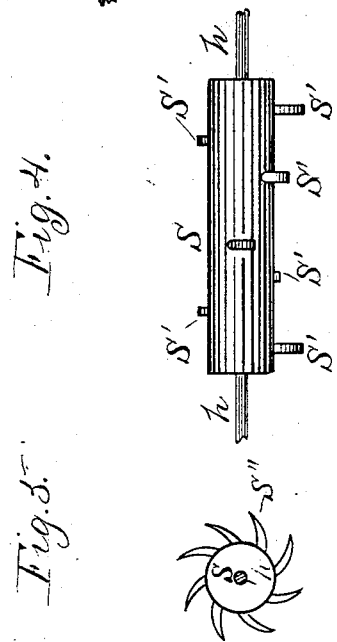

UNITED STATES PATENT OFFICE.

JOHN F. EDMISTON, OF EDMISTONVILLE, NORTH CAROLINA.

COTTON-SEED PLANTER AND CULTIVATOR.

SPECIFICATION forming part of Letters Patent No. 310,191, dated January 6, 1885.

Application filed April 9, 1884. (No model.)

*To all whom it may concern:*

Be it known that I, JOHN F. EDMISTON, a citizen of the United States, residing at Edmistonville, in the county of Rowan and State of North Carolina, have invented certain new and useful Improvements in Cotton - Seed Planters and Cultivators; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

The object of this improvement is a cotton-seed planter and cultivator that will distribute or discharge the seed with greater regularity, both as regards quantity and space, than other implements of its class, and that can be used as a cultivator either between or astride the rows, and so adjusted that it will stir and move the dirt either to or from the center of the rows, or so adjusted that it will move the dirt toward the plants from the centers of two rows when used as a straddle-row cultivator. These results are attained by the mechanism illustrated in the drawings herewith filed as part hereof, in which the same letters of reference denote the same parts in all the views.

Figure 1 is a side elevation of my improvement. Fig. 2 is a sectional plan view taken on the lines $x'$ $x^2$ $x^3$ $x^4$ $x^5$ of Fig. 1. Fig. 3 represents an interior view of one of the parts. Fig. 4 is a view of one of the parts detached. Fig. 5 is an end view of the same. Fig. 6 is a view of other parts detached.

A A represent recessed or slotted drag-bars having upward inclinations, A', and may be made of cast metal or in parts bolted or riveted together, as shown at $a$.

B is a curved bar transversely connected with and bracing the drag-bars at the rear end of the implement, and B' is a rod having shoulders $b$ transversely connecting and bracing the drag-bars at their front ends. The rod B' also operates as a hinge for the draft-beam C C', broadened at the inner ends, C''', provided with perforations for the reception of bolts $c''$, by means of which the draft-beam C C' can be adjusted and secured in position at different angles, and the draft of the cultivator thereby regulated, additional means for regulating the same being provided at the perforated front end, $c$.

D indicates rolling cutters having sharpened edges $d$, and secured to a shaft which revolves in bearings D', having screw-threaded extensions passing through shouldered sleeves $d'$, inserted in the recessed drag-bars, to which they are secured by means of nuts and washers, as shown at $d''$, Fig. 1.

Secured to the same shaft with the cutters D is a rimmed pulley, E, from which motion is imparted through crossed belt F to rimmed pulley G, having bevel-gear extensions G' made integral therewith and provided with a shaft, $g$, supported by standards J, secured to the drag-bars by means of screw-threaded extensions of the parts K', and nuts, as shown at $k'$ in Fig. 1. The bevel-gear G' meshes with corresponding gear, H, affixed to shafting $h$, revolving in bearings $n$, forming parts of pendent supports N, secured to the cultivator-handles L by bolts $n'$, or other suitable means. The handles L are supported by curved plates L', bolted to the drag-bars, as shown at $l'$, in the front part of the implement, and by standards L'', secured to the rear ends of the drag-bars by bolts or rivets, as may be desired.

Suspended between the handles L is the seed-box M, having concaved sides R, provided with a series of slots, R', corresponding in position with the points of seed-pickers S', affixed to cylinders S, attached to the shafting $h$, which receives motion through gearing G' and H, and which is provided with collars and set-screws at their rear ends, as shown at $h'$, Fig. 1, for securing the positions thereof.

K K represent cultivator-shovels of any suitable shape, having screw-threaded extensions $k$, which are inserted through sleeves T, as shown in Fig. 6, fitting the slots or recesses in the drag-bars, and provided with rims or shoulders T', which engage with the lower edges of the drag-bars, and in connection with the washers T'' and nuts, as shown, gives the means of securing the shovels K to the drag-bars, and enables their adjustment at any angle, either inwardly or outwardly, whereby the soil may be stirred and moved to or from the middle of the rows toward the plants, or from the plants toward the middle of the rows when the implement is used as a straddle-row cultivator.

Secured to the drag-bars at the outer sides of the rolling cutters D, in a manner similar to that of the shovels K, are cultivator-points K', the front or inner edges of which set closely to the sides of the cutters, and prevent the adhesion to and accumulation of soil thereon.

The object of the rolling cutters is to sever the roots of weeds growing near the plants, and thus suspend or retard their growth.

The seed-pickers S' on the cylinders S are to be arranged in spiral order, so they will consecutively enter the slots R' in the concaved sides of the seed-box M, and remove the seed therefrom, and thus cause them to drop to the ground as the cultivator moves forward.

The spaces between the planting may be regulated by the number and positions of the seed-pickers S' on the cylinder S.

After the planting-season is over the seeding mechanism may be detached and the implement used as a cultivator only.

Having explained the construction and operation of my improvement, what I claim as new, and desire to secure by Letters Patent, is—

1. In a cotton-seed planter and cultivator, the combination of the seed-box having concaved slotted sides and the rotating cylinders S, provided with a series of seed-pickers, S', arranged in spiral order to consecutively enter the slots in the seed-box and engage with and discharge the seed, substantially as specified.

2. The rolling cutters D D, provided with adjustable bearings D', in combination with the upwardly-inclined drag-bars A, as and for the purpose set forth.

3. The cultivator-blades K and K', provided with integral shanks $k$ and shouldered sleeves T T' and washers T'', in combination with recessed drag-bars A, having upward inclination, substantially as specified.

4. The combination of the drag-bars A, standards J J, pulley E, cross-belt F, pulley G, and rotary seed-picking mechanism, substantially as and for the purpose set forth.

In testimony whereof I affix my signature in presence of two witnesses.

JOHN F. EDMISTON.

Witnesses:
JNO. D. L. BROWN,
BENJAMIN C. PARKER.